United States Patent
Brown et al.

(10) Patent No.: US 10,126,480 B2
(45) Date of Patent: Nov. 13, 2018

(54) DISPLAY BACKLIGHT WITH LIGHT MIXING STRUCTURES

(71) Applicant: Apple Inc., Cupertino, CA (US)

(72) Inventors: Michael J. Brown, Cupertino, CA (US); David A. Doyle, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 506 days.

(21) Appl. No.: 14/861,686

(22) Filed: Sep. 22, 2015

(65) Prior Publication Data

US 2017/0045663 A1 Feb. 16, 2017

Related U.S. Application Data

(60) Provisional application No. 62/204,649, filed on Aug. 13, 2015.

(51) Int. Cl.
*G02F 1/1335* (2006.01)
*F21V 8/00* (2006.01)

(52) U.S. Cl.
CPC .......... *G02B 6/0018* (2013.01); *G02B 6/0021* (2013.01); *G02B 6/0025* (2013.01); *G02B 6/0028* (2013.01); *G02B 6/0036* (2013.01); *G02B 6/0038* (2013.01); *G02B 6/0043* (2013.01)

(58) Field of Classification Search
CPC ................................................ G02F 1/133615
See application file for complete search history.

(56) References Cited

U.S. PATENT DOCUMENTS

| | | | |
|---|---|---|---|
| 7,325,960 B2 | 2/2008 | Chiang et al. | |
| 7,573,543 B2 | 8/2009 | Choi et al. | |
| 8,749,729 B2 | 6/2014 | Sasaki et al. | |
| 2007/0263383 A1* | 11/2007 | Ansems | G02B 6/002 362/231 |
| 2007/0263409 A1 | 11/2007 | Mok | |
| 2014/0085930 A1 | 3/2014 | Hua et al. | |
| 2015/0002771 A1* | 1/2015 | Nakamoto | G02B 6/0016 349/42 |

OTHER PUBLICATIONS

"Light Guide Techniques—Using LED Lamps", Application Brief I-003, p. 1-22, 2006, Avago Technologies.

* cited by examiner

*Primary Examiner* — Phu Vu
(74) *Attorney, Agent, or Firm* — Treyz Law Group, P.C.; Joseph F. Guihan

(57) ABSTRACT

A display may have a backlight unit with a row of light-emitting diodes that emit light into the edge of a light guide plate. The light guide plate may have opposing upper and lower surfaces. The upper surface of the light guide plate may have ridges and the lower surface of the light guide plate may have bumps. The edge of the light guide plate may have light mixing structures. The light mixing structures may include edge surfaces that refract light at a high angle. The high angle light may then be reflected by a reflective surface so that the light propagates down the light guide plate. Some light may pass through the light mixing structures and propagate down the light guide plate without being reflected by the reflective surface. This arrangement may reduce the mixing distance of the backlight unit.

18 Claims, 16 Drawing Sheets

DISPLAY BACKLIGHT WITH LIGHT MIXING STRUCTURES

This application claims the benefit of provisional patent application No. 62/204,649 filed on Aug. 13, 2015, which is hereby incorporated by reference herein in its entirety.

BACKGROUND

This relates generally to electronic devices with displays, and, more particularly, to displays with backlights.

Electronic devices such as computers and cellular telephones have displays. Some displays such as plasma displays and organic light-emitting diode displays have arrays of pixels that generate light. In displays of this type, backlighting is not necessary because the pixels themselves produce light. Other displays contain passive pixels that can alter the amount of light that is transmitted through the display to display information for a user. Passive pixels do not produce light themselves, so it is often desirable to provide backlight for a display with passive pixels.

In a typical backlight assembly for a display, a light guide plate is used to distribute backlight generated by a light source such as a light-emitting diode light source. Optical films such as a diffuser layer and prism films may be placed on top of the light guide plate. A reflector may be formed under the light guide plate to improve backlight efficiency.

A strip of light-emitting diodes may provide light to an edge of a light guide plate. Light from the strip of light-emitting diodes is initially concentrated in the vicinity of the outputs of the light-emitting diodes. The light must travel a sufficient distance into the light guide plate to mix enough to be used as backlight illumination. Backlight units that require large mixing distances may consume more volume within a display than desired.

It would therefore be desirable to be able to provide displays with improved backlights.

SUMMARY

A display may have an array of pixels for displaying images for a viewer. The array of pixels may be formed from display layers such as a color filter layer, a liquid crystal layer, a thin-film transistor layer, and polarizer layers.

A backlight unit may be used to produce backlight illumination for the display. The backlight illumination may pass through the polarizers, the thin-film transistor layer, the liquid crystal layer, and the color filter layer. The backlight unit may have a row of light-emitting diodes that emit light into a light guide plate.

The light guide plate may have first and second opposing surfaces connected by an edge that receives light from the row of light-emitting diodes. The edge of the light guide plate may have a light mixing structure and a reflective portion. A portion of the light emitted by the light-emitting diodes may pass through the light mixing structure and be refracted at a high angle. The portion of light may subsequently be reflected by the reflective portion of the edge. An additional portion of the light may pass through the light mixing structure and be refracted at a low angle. The additional portion of the light may not be reflected by the reflective portion.

The light mixing structures may include protrusions with edge surfaces and center surfaces. The edge surfaces may be positioned at a first angle with respect to a planar portion of the edge of the light guide plate. The center surfaces may be positioned at a second angle with respect to the planar portion of the edge of the light guide plate. The first angle may be greater than the second angle. The center surfaces may be interposed between the edge surfaces.

Further features of the invention, its nature and various advantages will be more apparent from the accompanying drawings and the following detailed description of the preferred embodiments.

DETAILED DESCRIPTION

Figure 1:
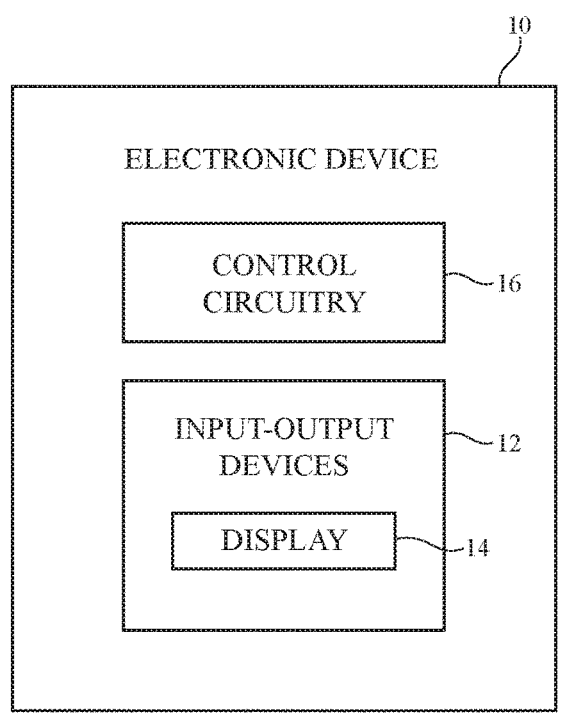
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14.

Device 10 may be a tablet computer, laptop computer, a desktop computer, a television, a cellular telephone, a media player, a wristwatch device or other wearable electronic equipment, or other suitable electronic device.

Display 14 for device 10 includes an array of pixels. The array of pixels may be formed from liquid crystal display (LCD) components or other suitable display structures. Configurations based on liquid crystal display structures are sometimes described herein as an example.

A display cover layer may cover the surface of display 14 or a display layer such as a color filter layer, thin-film transistor layer, or other portion of a display may be used as the outermost (or nearly outermost) layer in display 14. The outermost display layer may be formed from a transparent glass sheet, a clear plastic layer, or other transparent member.

Figure 2:
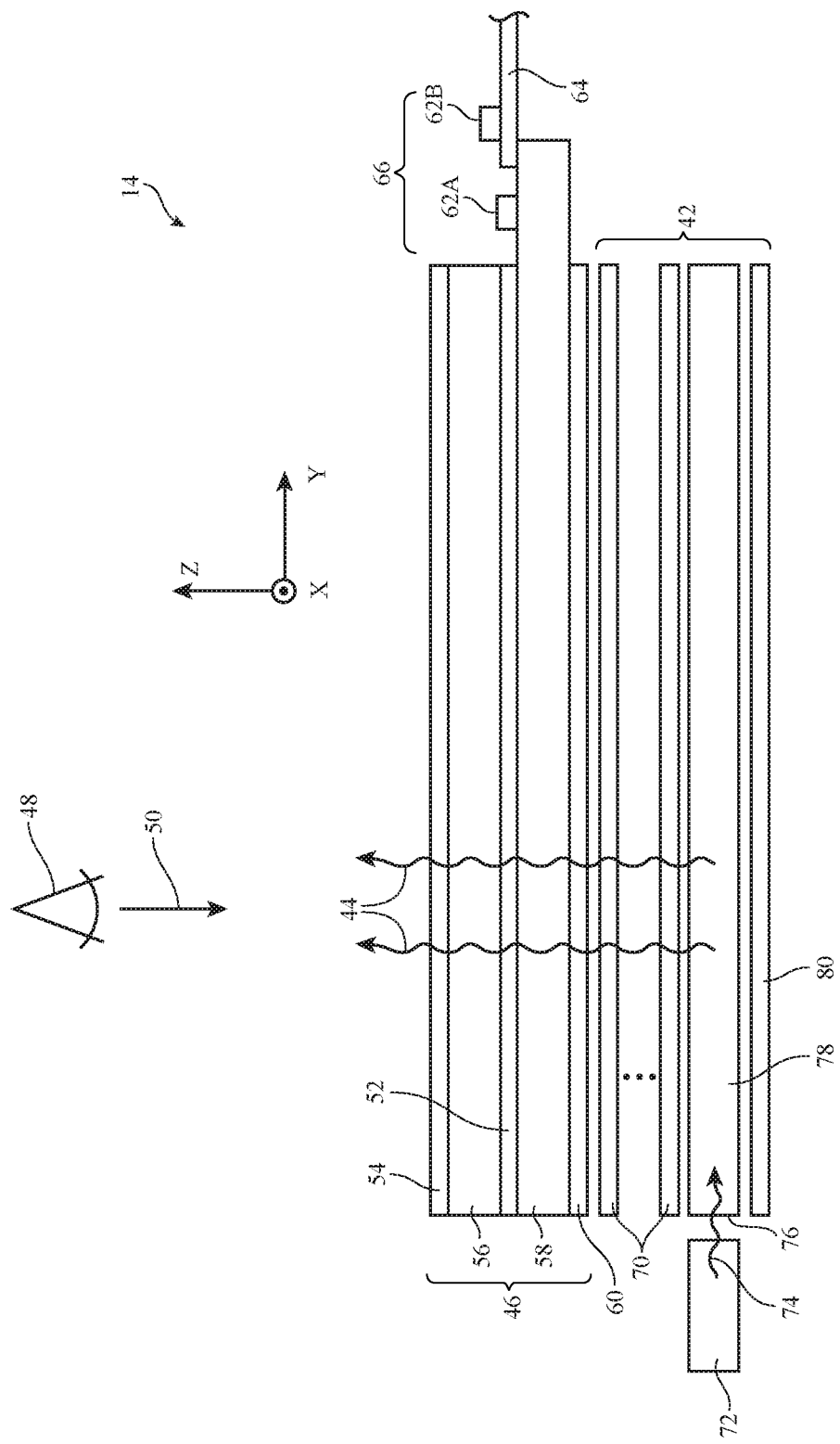
FIG. 2 is a cross-sectional side view of an illustrative display in an electronic device in accordance with an embodiment.

A cross-sectional side view of an illustrative configuration for display 14 of device 10 is shown in FIG. 2. As shown in FIG. 2, display 14 may include a backlight unit such as backlight unit 42 (sometimes referred to as a backlight or backlight structures) for producing backlight 44. During operation, backlight 44 travels outwards (vertically upwards in dimension Z in the orientation of FIG. 2) and passes through pixel structures in display layers 46. This illuminates any images that are being produced by the pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in a housing in device 10 or display layers 46 may be mounted directly in an electronic device housing for device 10 (e.g., by stacking display layers 46 into a recessed portion in a metal or plastic housing). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example). Integrated circuits such as integrated circuit 62A and/or flexible printed circuits such as flexible printed circuit 64 may be attached to substrate 58 in ledge region 66 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes (e.g., a series of light-emitting diodes that are arranged in a row that extends into the page in the orientation of FIG. 2). The array of light-emitting diodes may be mounted to a rigid or flexible printed circuit. The printed circuit may be adhered to adjacent layers in the electronic device. In certain embodiments, the printed circuit may be adhered to portions of light guide plate 78.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits, bumps, grooves, or ridges that help light exit light guide plate 78 for use as backlight 44. These features may be located on an upper surface and/or on an opposing lower surface of light guide plate 78. With one illustrative configuration, which is described herein as an example, a first surface such as the lower surface of light guide plate 78 has a pattern of bumps and an opposing second surface such as the upper surface of light guide plate 78 has a pattern of ridges (sometimes referred to as lenticules, lenticular structures, or lenticular ridges). Light source 72 may be located at the left of light guide plate 78 as shown in FIG. 2 or may be located along the right edge of plate 78 and/or other edges of plate 78.

Light 74 that scatters upwards in direction Z from light guide plate 78 may serve as backlight 44 for display 14. Light 74 that scatters downwards may be reflected back in the upward direction by reflector 80. Reflector 80 may be formed from a reflective structure such as a substrate layer of plastic coated with a dielectric mirror formed from alternating high-index-of-refraction and low-index-of-refraction inorganic or organic layers. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots. Optical films 70 may also include prism films (sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 2, optical films 70 and reflector 80 may each have a matching rectangular footprint. Optical films 70 may include compensation films for enhancing off-axis viewing or compensation films may be formed within the polarizer layers of display 14 or elsewhere in display 14.

Figure 3:
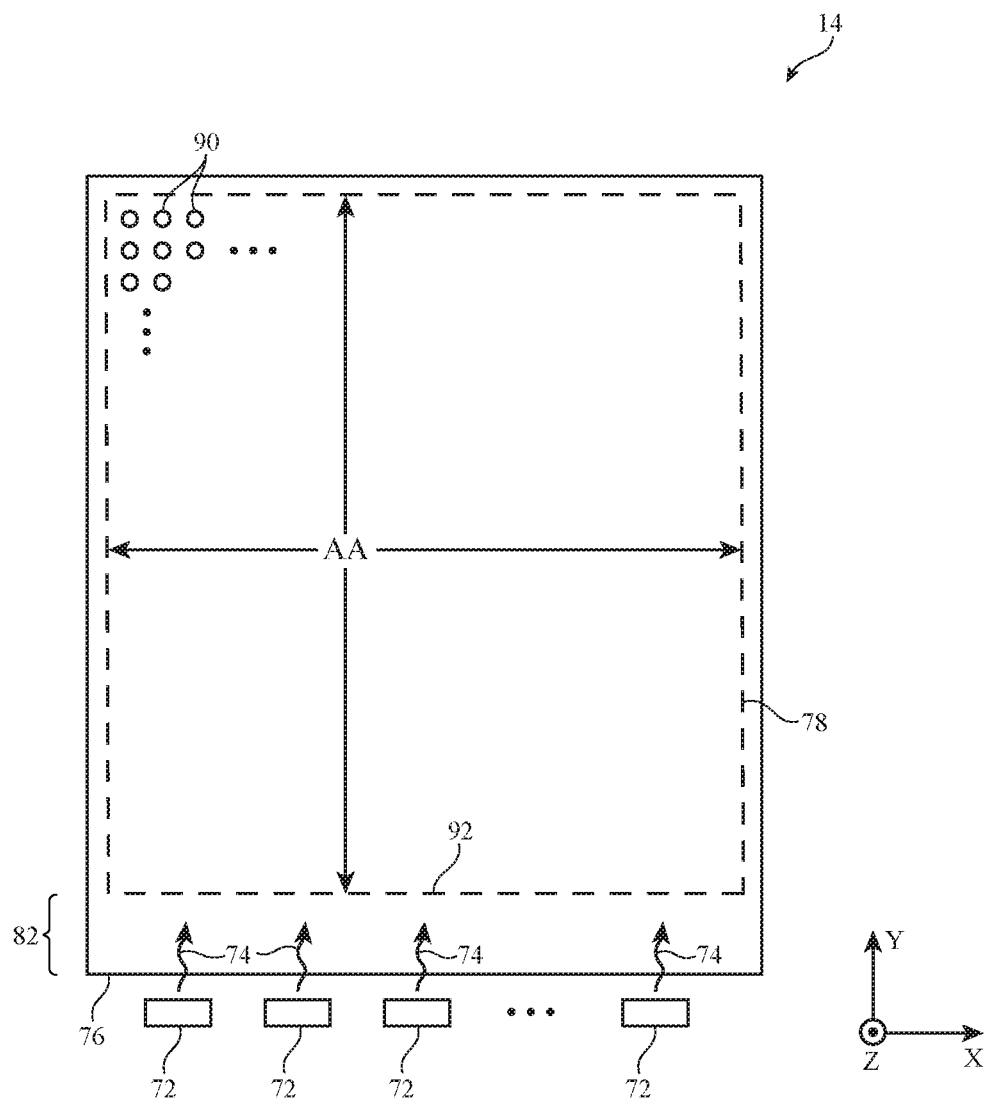
FIG. 3 is a top view of an illustrative display in accordance with an embodiment.

FIG. 3 is a top view of a portion of display 14 showing how display 14 may have an array of pixels 90 formed within display layers 46. Pixels 90 may have color filter elements of different colors such as red color filter elements R, green color filter elements G, and blue color filter elements B. Pixels 90 may be arranged in rows and columns and may form active area AA of display 14. The borders of active area AA may be slightly inboard of the borders of light-guide plate 78 to ensure that there are no visible hotspots in display 14 (i.e., no areas in which the backlight illumination for display 14 is noticeably brighter than surrounding areas). For example, border 92 of active area AA may be offset by a distance 82 from lower edge 76 of light guide plate. It is generally desirable to minimize the size of distance 82 so that display 14 is as compact as possible for a given active area size. Nevertheless, distance 82 should not be too small to ensure that there is adequate light mixing. In particular, distance 82 should be sufficiently large to allow light 74 that is emitted from light-emitting diodes 72 to homogenize enough to serve as backlight illumination. Distance 82 is often as long as necessary to ensure light from light-emitting diodes 72 is sufficiently mixed. Accordingly, distance 82 may sometimes be referred to as mixing distance 82. When light 74 is initially emitted from individual light-emitting diodes 72, light 74 is concentrated at the exits of light-emitting diodes 72 and is absent in the spaces between light-emitting diodes 72. After light 74 has propagated sufficiently far within light-guide plate 78 (i.e., after light 74 has traversed a sufficiently large mixing distance 82), light 74 will be smoothly distributed along dimension X and will no longer be concentrated near the exits of respective individual light-emitting diodes 72.

Figure 4:
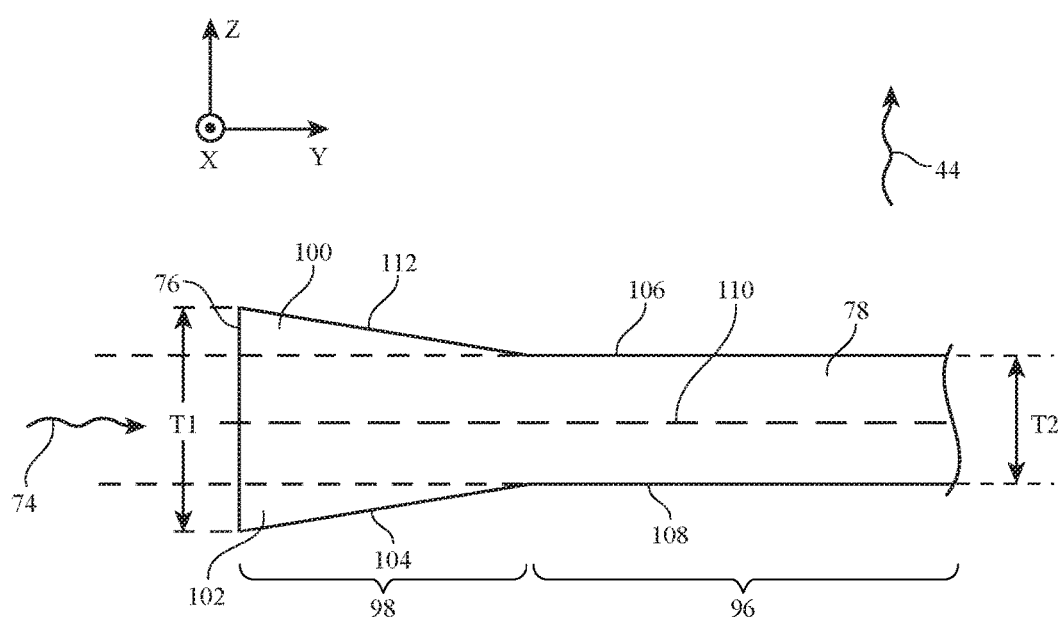
FIG. 4 is cross-sectional side view of an illustrative symmetrically tapered portion of a light guide plate for a display backlight in accordance with an embodiment.

To enhance the efficiency with which light 74 is coupled into edge 76 of light guide plate from light-emitting diodes 72 without overly thickening light-guide plate 78, it may be desirable to provide light-guide plate 78 with an outwardly tapered (flared) edge. Conventional edge tapers are formed by creating a taper in the upper surface of a light guide plate adjacent to the light-emitting diodes and leaving the opposing planar lower surface of the light guide plate untouched. If care is not taken, however, this type of taper may have an angle that is too steep, raising the potential for excessive light leakage due to the loss of total internal reflection conditions in the taper region. With the illustrative taper configuration shown in the cross-sectional side view of illustrative light guide plate 78 of FIG. 4, excessive light losses are avoided by providing light guide plate 78 with both upper and lower taper structures 100 and 102, respectively. Tapers 102 and 100 may be symmetrical or tapers 102 and 100 may have different shapes. In region 96, light-guide plate 78 is planar and has planar parallel opposing upper and lower surfaces 106 and 108, respectively. In taper region 98, light guide plate 78 has a thickness that varies from the thickness of region 96 (T2) to enlarged thickness T1 at edge 76, so taper structure surfaces 112 and 104 are angled at non-zero angles with respect to planar upper and lower light guide plate surfaces 106 and 108. Thickness T2 may be about 400 microns 300-500 microns, less than 600 microns, more than 200 microns, or other suitable thickness. The enlarged size of dimension T1 helps light guide plate 78 receive light 74 from light-emitting diodes 72. The taper in light guide plate 78 formed by taper structures 100 and 102 helps concentrate light 74 into region 96 of light guide plate for use in forming backlight 44.

Figure 5:
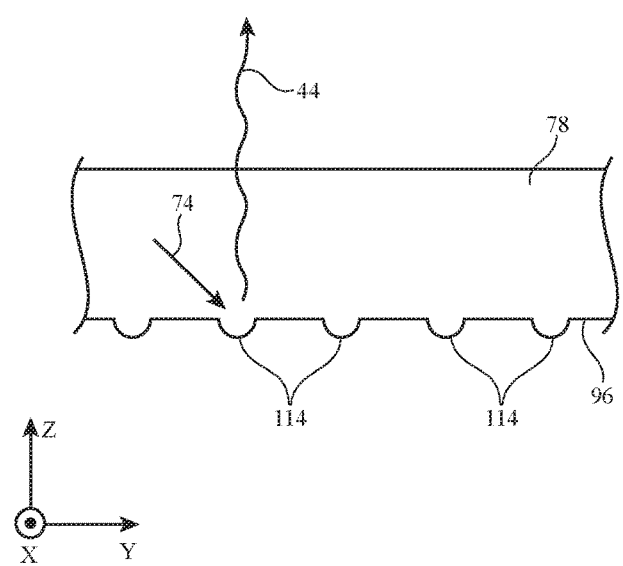
FIG. 5 is a cross-sectional side view of an illustrative light guide plate with light-scattering features such as bumps on its lower surface in accordance with an embodiment.

As shown in FIG. 5, lower surface 96 of light guide plate 78 may be provided with light scattering features such as bumps (protrusions) 114. Bumps 114 may help redirect light 74 that is traveling within the interior of light guide plate 78 upwards in direction Z to serve as backlight 44 for display 14.

Figure 6:
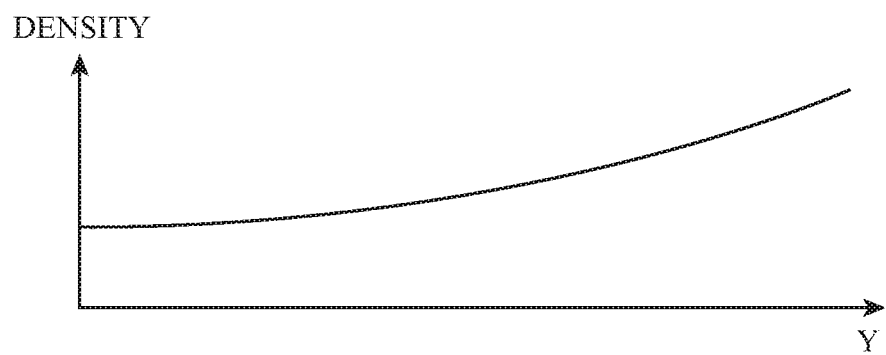
FIG. 6 is graph in which bump density has been plotted as a function of position along the length of a light guide plate in accordance with an embodiment.

As light 74 that is traveling within light guide plate 78 is directed upwards in direction Z to serve as backlight 44, the intensity of the light 74 that remains in light guide plate 78 decreases. As a result, the intensity of light 74 is greatest at edge 76 of light guide plate 78 adjacent to light-emitting diodes 72 and decreases with increasing distance along axis Y away from edge 76. It is generally desirable for the intensity of backlight 44 to be evenly distributed across the surface of light guide plate 78 in dimensions X and Y. To ensure that backlight 44 is not too dim at large values of Y, the density of bumps 114 can be increased as a function of increasing value of Y, as shown in FIG. 6. The increase in the density of bumps 114 at larger Y values offsets the decrease in the intensity of light 74 within light guide plate at larger Y values and thereby ensures that backlight 44 has a uniform intensity as a function of dimension Y.

Figure 7:
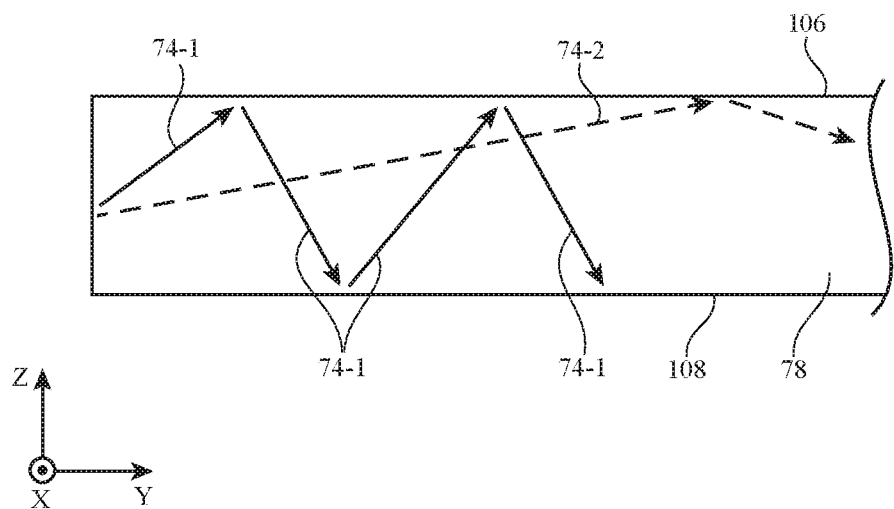
FIG. 7 is a cross-sectional side view of a light guide plate showing how different light rays interact with the surfaces of the light guide plate by different amounts in accordance with an embodiment.
Figure 8:
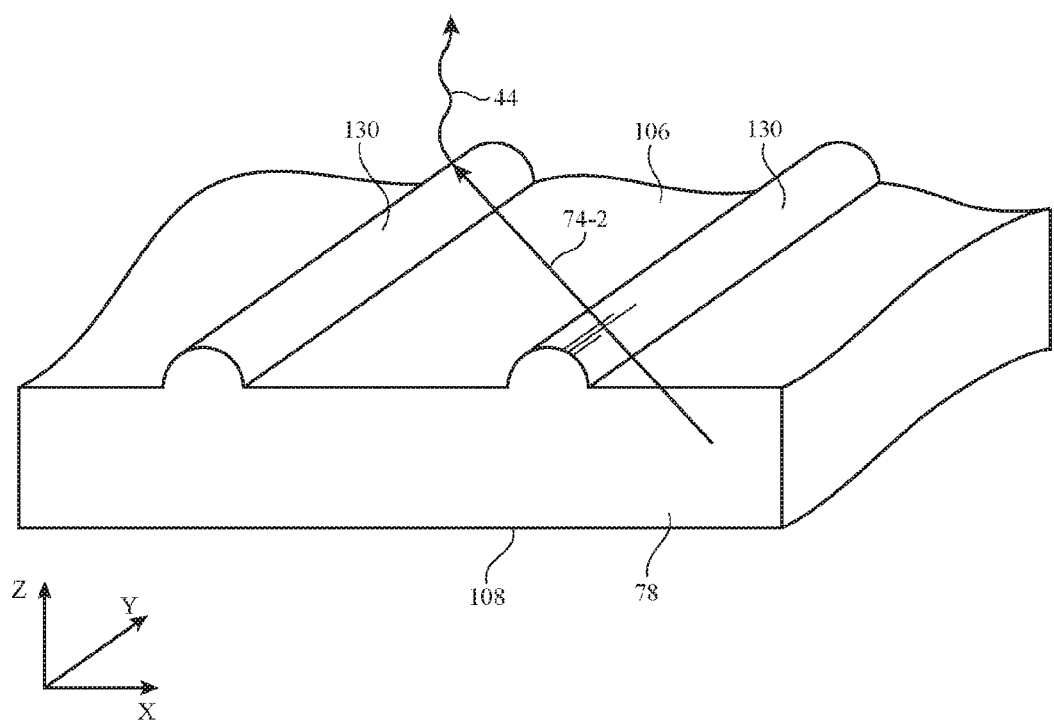
FIG. 8 is a cross-sectional perspective view of a light guide plate showing how rounded ridges may extend along the upper surface of the light guide plate in accordance with an embodiment.

Light-emitting diodes 72 emit light 74 in a cone. This cone of light includes highly angled off-axis light rays. As shown in the cross-sectional side view of light guide plate 78 of FIG. 7, some of the highly angled light rays such as light ray 74-1 lie primarily in the YZ plane. These light rays interact strongly with upper surface 106 and lower surface 108 of light guide plate and therefore tend to be heavily extracted by bumps 114 on lower surface 108. Other highly angled light rays in the cone of emitted light 74 such as illustrative light ray 74-2 in FIG. 7 lie primarily in the XY plane. These rays are angled more along dimension X than dimension Z and therefore interact with surfaces 106 and 108 less frequently than ray 74-1. To ensure that light rays such as light ray 74-2 are adequately extracted and can serve as backlight 44, light guide plate 78 may be provided with lenticular ridges such as ridges 130 of FIG. 8. Ridges 130 may be formed on upper surface 106 of light guide plate 78 (as an example). As shown in FIG. 8, ridges 130 may run parallel to dimension Y (i.e., the direction in which the exit faces of light-emitting diodes 72 are oriented and the direction in which light 74 is emitted into edge 76 of light guide plate 78). Ridges 130 may have semicircular cross-sectional shapes or may have other suitable shapes (triangular, etc.). As shown in FIG. 8, the presence of ridges 130 may help extract highly angled light rays such as light ray 74-2 that are propagating close to the XY plane to produce corresponding backlight 44.

Figure 9:
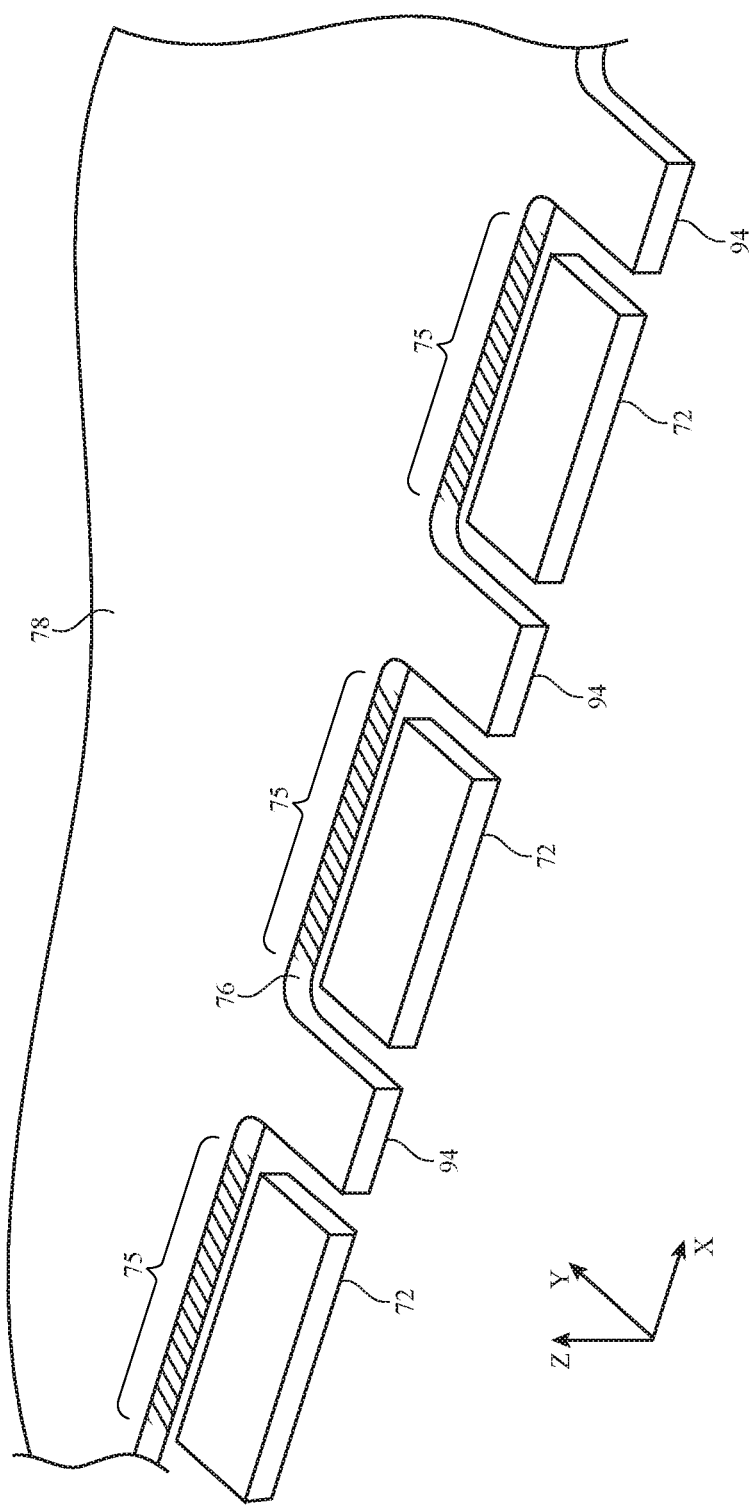
FIG. 9 is a perspective view of an illustrative light guide plate with light mixing structures along an edge in accordance with an embodiment.

FIG. 9 is a perspective view of an illustrative light guide plate. As shown, the light guide plate may have protruding portions 94 that extend between light-emitting diodes 72. The light-emitting diodes 72 may be positioned on a rigid or flexible printed circuit (not shown in FIG. 9). Protruding portions 94 may act as a substrate for securing the printed circuit. For example, adhesive may attach the bottom surface of protruding portions 94 to a rigid or flexible printed circuit. Light-emitting diodes may be positioned on the printed circuit such that each light-emitting diode is interposed between two protruding portions 94 when the printed circuit is adhered to protruding portions 94. Any type of adhesive may be used to attach protruding portions 94 to a rigid or flexible printed circuit (e.g., pressure sensitive adhesive, liquid cured adhesive, light cured adhesive, etc.).

As discussed in connection with FIG. 3, a given mixing distance may be necessary to ensure that light from light-emitting diodes is homogenous before entering the active area of the display. In order to reduce the size of display 14 and, accordingly, electronic device 10, it may be desirable to reduce the length of mixing distance 82. To reduce mixing distance 82, edge 76 of light guide plate 78 may include light mixing structures. Edge 76 may be defined as the surface that connects the top surface of light guide plate 78 to the bottom surface of light guide plate 78. Edge surface 76 may be substantially perpendicular to the top and bottom surfaces of light guide plate 78. Edge surface 76 may be substantially perpendicular to optical films 70 and reflector 80. Regions 75 of edge surface 76 (e.g., the regions in front of the light-emitting diodes) may include light mixing structures. Light mixing structures may be included on the edge of light guide plate 78 for the portions of edge 76 that are directly in front of light-emitting diodes 72. This will ensure that light exiting light-emitting diodes 72 travels through the light mixing structures while entering light guide plate 78.

Figure 10:
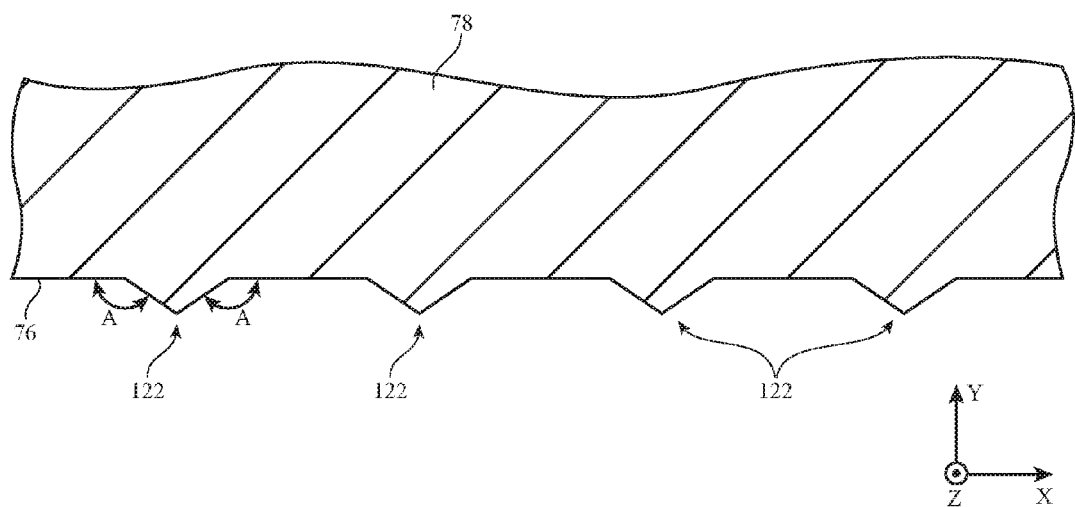
FIG. 10 is a top view of illustrative protrusions for mixing light in accordance with an embodiment.

FIG. 10 is a top view of an illustrative light guide plate with light mixing structures. As shown in FIG. 10, edge 76 of light guide plate 78 may be provided with locally raised features such as protrusions 122. Protrusions 122 may have semicircular profiles, or may have other shapes. Angle A may be about 140-175° or other suitable value to help refract light 74 at angles in plate 78, thereby enhancing light mixing and helping to reduce mixing distance 82 (FIG. 3). Protrusions 122 may have widths (in dimension X) of about 75-125 microns or other suitable widths. Protrusions 122 may be spaced apart by about 250 microns, 200-300 microns, less than 320 microns, or more than 150 microns (as examples). Protrusions 122 may be spread evenly along edge 76 or may be clustered adjacent to respective light-emitting diodes 72.

Figure 11A:
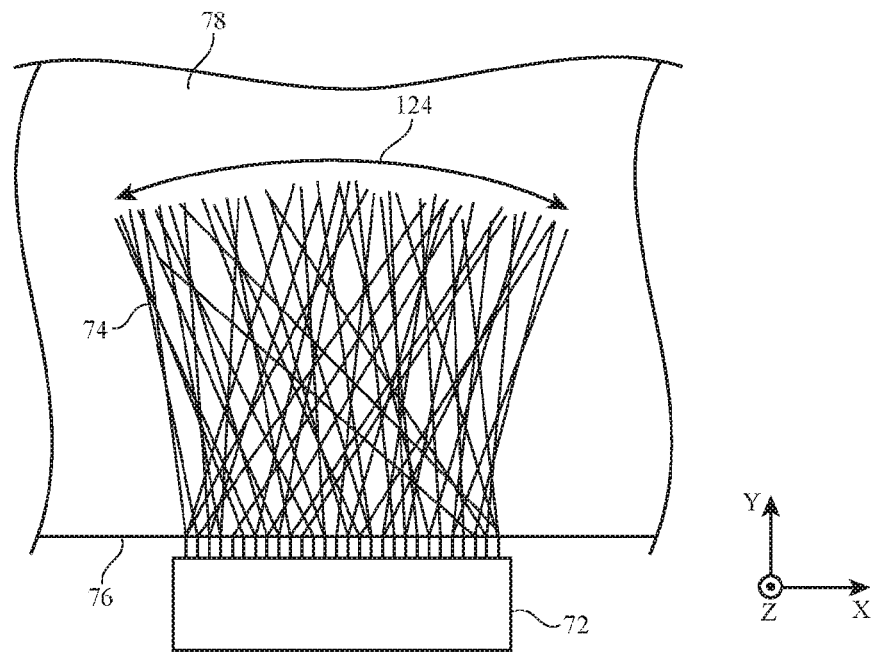
FIGS. 11A and 11B are top views of light-emitting diodes emitting light into light guide plates showing how light is mixed with and without the protrusions of FIG. 10 in accordance with an embodiment.
Figure 11B:
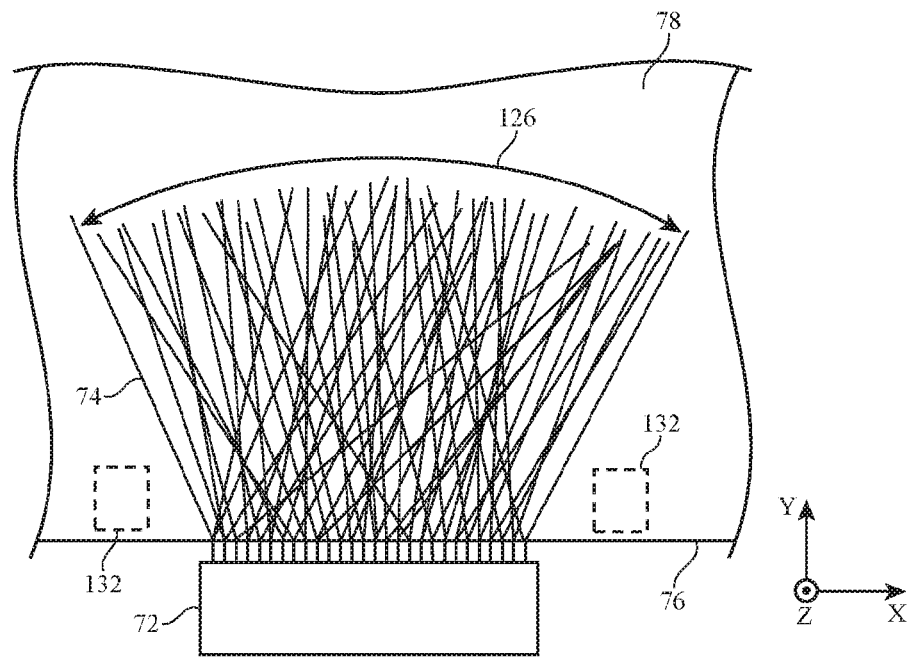

FIGS. 11A and 11B show the light emission of a light-emitting diode with and without protrusions 122. FIG. 11A shows a light-emitting diode 72 emitting light rays 74 into a light guide plate 78 with a planar edge surface 76. In FIG. 11A, edge 76 may lack light mixing structures such as protrusions 122. As shown, light-emitting diode 72 emits light 74 in a cone. The cone of light in FIG. 11A has a width 124. FIG. 11B shows a light-emitting diode 72 emitting light rays 74 into a light guide plate 78 with an edge surface 76 that has light mixing structures. In FIG. 11B, edge 76 may include protrusions 122 as shown in FIG. 10. As shown, the width 126 of the cone of light in FIG. 11B is greater than the width 124 of the cone of light in FIG. 11A. The protrusions assist in spreading the light. This may assist in decreasing mixing distance 82.

Even with the additional light mixing caused by protrusions 122, there may still be portions of light guide plate 78 that do not receive light 74 close to edge 76. As previously mentioned, when light 74 is initially emitted from individual light-emitting diodes 72, light 74 is concentrated at the exits of light-emitting diodes 72 and is absent in the spaces between light-emitting diodes 72. For example, area 132 (positioned in between light-emitting diodes 72) in FIG. 11B may not receive any light. In order to distribute light to regions in between light-emitting diodes 72 (e.g., area 132), light mixing structures must generate high angled light rays. In this context, low angled rays may mean light that travels substantially in the X direction, while high angled rays may mean light that travels substantially in the Y direction.

High-angled light rays may reach the areas in between light-emitting diodes. However, high-angled light rays may leak out of lenticular ridges 130, causing undesirable bright bands. High-angled light rays may also leak out of the edges of light guide plate 78. Therefore, while some high-angled light is desirable to reduce mixing distance 82, too much high-angled light may not be desirable.

Figure 12A:
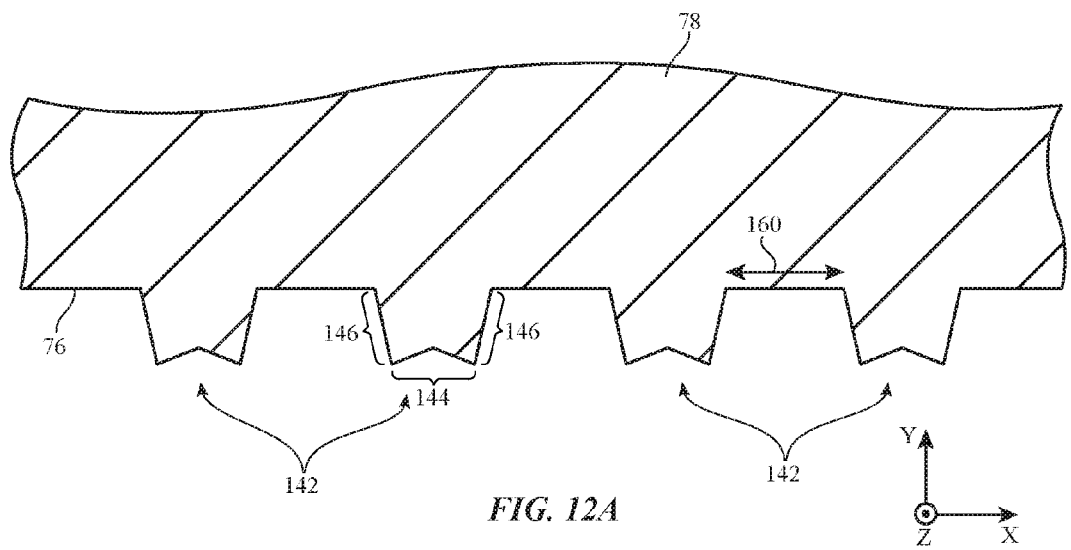
FIGS. 12A and 12B are top views of illustrative light mixing structures in accordance with an embodiment.

As shown in FIG. 12A, in order to reduce mixing distance 82 while ensuring there is not too much high-angled light, display 14 may be provided with light mixing structures 142. Light mixing structures 142 may include center surfaces 144 and edge surfaces 146. Center surfaces 144 may be interposed between edge surfaces 146. Center surfaces 144 may connect a first edge surface to a second edge surface. A portion of light that travels through light mixing structures 142 will pass through the center surfaces while a portion will travel through the edge surfaces. The light that travels through the center surfaces may respond similarly to light travelling through protrusions 122 in FIG. 11B. The light that travels through the edge surfaces may exit the light mixing structures at a very high angle. In this way, light mixing structures 142 produce both low angle and high angle light.

Figure 12B:
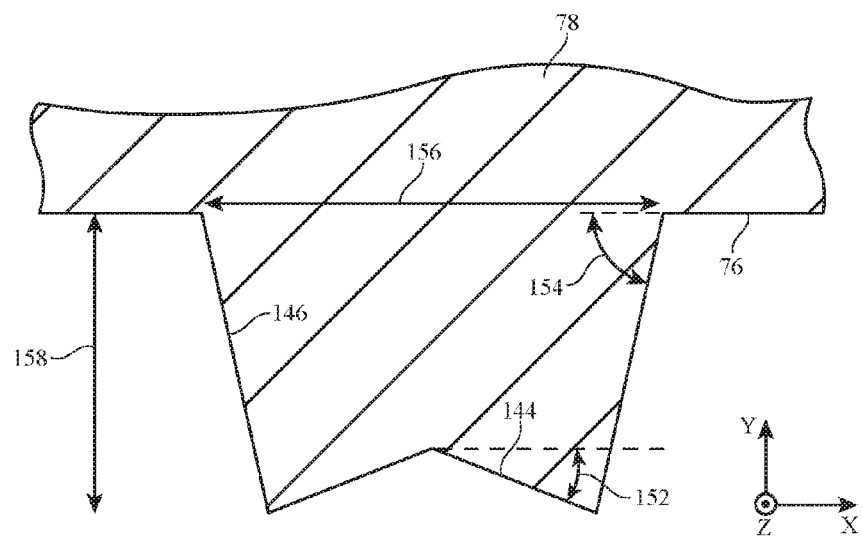

FIG. 12B is a top view of a single illustrative light mixing structure 142. As shown, the center surfaces 144 may be positioned at angle 152 with respect to the plane of planar edge 76 (shown by the dashed line). Angle 152 may be between 5° and 35°, between 10° and 30°, between 15° and 25°, more than 15°, less than 30°, or any other desired value. In one illustrative embodiment, angle 152 may be 20°. In certain embodiments, angle 152 may be 0°. In these embodiments, a single surface that is parallel to planar edge 76 may connect edge surfaces 146. Edge surfaces 146 may be positioned at an angle 154 with respect to the plane of planar edge surface 76. Angle 154 may be between 70° and 89°, between 75° and 85°, more than 85°, less than 85°, or any other desired value. In one illustrative embodiment, angle 154 may be 80°.

The height and width of light mixing structures 142 may be any desired value. Height 158 may be, for example, between 5 microns and 100 microns, between 20 microns and 50 microns, less than 5 microns, more than 100 microns, more than 1000 microns, or any other desired distance. Width 156 may be, for example, between 30 and 100 microns, between 40 and 60 microns, less than 40 microns, greater than 40 microns, greater than 500 microns, or any other desired distance. In one illustrative example, height 158 may be equal to 25 microns while width 156 may be equal to 50 microns.

Each light mixing structure may be separated by distance 160, as shown in FIG. 12A. Distance 160 may be between 30 and 100 microns, between 40 and 60 microns, less than 40 microns, greater than 40 microns, greater than 500 microns, or any other desired distance. The distance between each light mixing structure may be uniform (e.g., the same distance separates each light mixing structure). The distance between each light mixing structure may also vary. The distance between some light mixing structures may be smaller than the distance between other light mixing structures.

The total amount of edge 76 that is taken up by light mixing structures 142 may be referred to as the coverage of the light mixing structures. For example, if the width 156 of each light mixing structure was 40 microns, the distance 160 between each light mixing structure was 60 microns, and the light mixing structures were evenly spaced in front of each light-emitting diode, the coverage of light mixing structure 142 would be 40%. Light mixing structures 142 may have a coverage of less than 10%, between 10% and 80%, between 35% and 65%, more than 65%, more than 80%, more than 90%, 100%, or any other desired percentage.

Instead of protrusions, the light mixing structures shown in FIGS. 10 and 12 may be implemented as recesses. For example, instead of triangular protrusion 122 in FIG. 10, the same shaped triangle may be formed as a recess. In one illustrative example, angle A of triangular protrusion 122 in FIG. 10 may be equal to 160°. Instead a triangular recess may be formed, with angle A made equal to 200°.

Figure 13A:
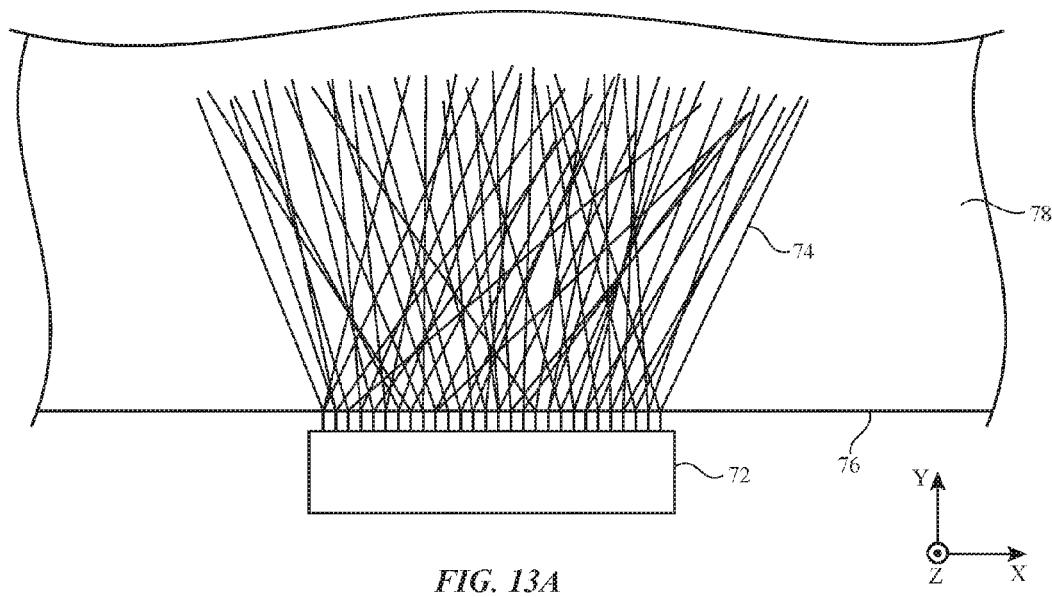
FIGS. 13A and 13B are top views of light-emitting diodes emitting light through the center surfaces and edge surfaces of the light mixing structures of FIGS. 12A and 12B in accordance with an embodiment.
Figure 13B:
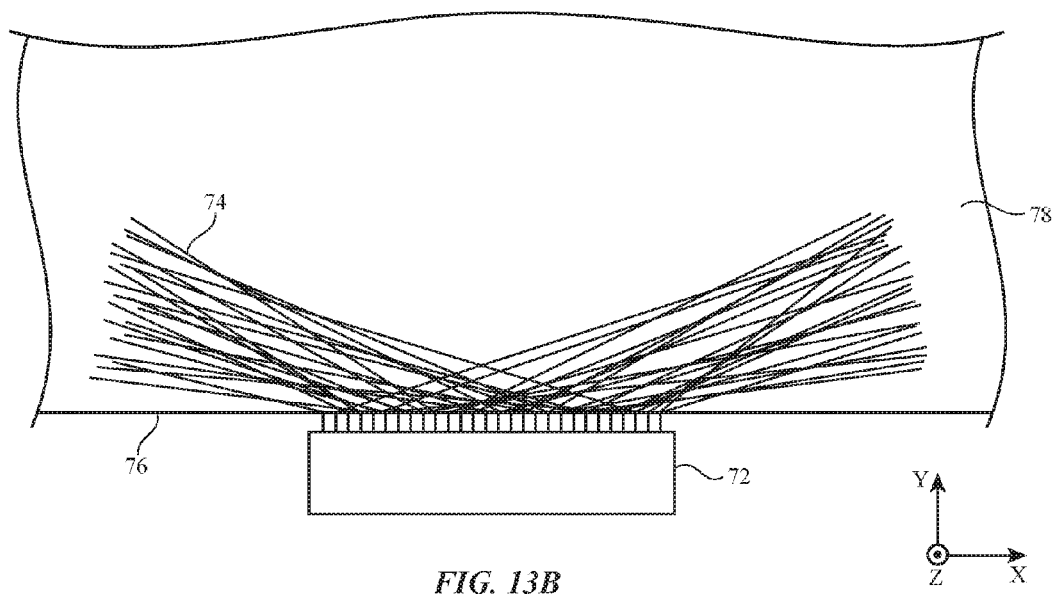

FIGS. 13A and 13B show how light is scattered when passing through the center surfaces and edge surfaces of light mixing structures 142. FIG. 13A shows light 74 emitted from light-emitting diode 72 that passes through the center surfaces 144 of light mixing structures 142. As shown, light 74 that passes through center surfaces 144 is emitted in a cone primarily in the Y direction similar to those shown in FIGS. 11A and 11B. FIG. 13B shows light 74 emitted from light-emitting diode 72 that passes through the edge surfaces 146 of light mixing structures 142. As shown, light 74 that passes through edge surfaces 146 is refracted at a high angle primarily in the X direction.

Figure 14:
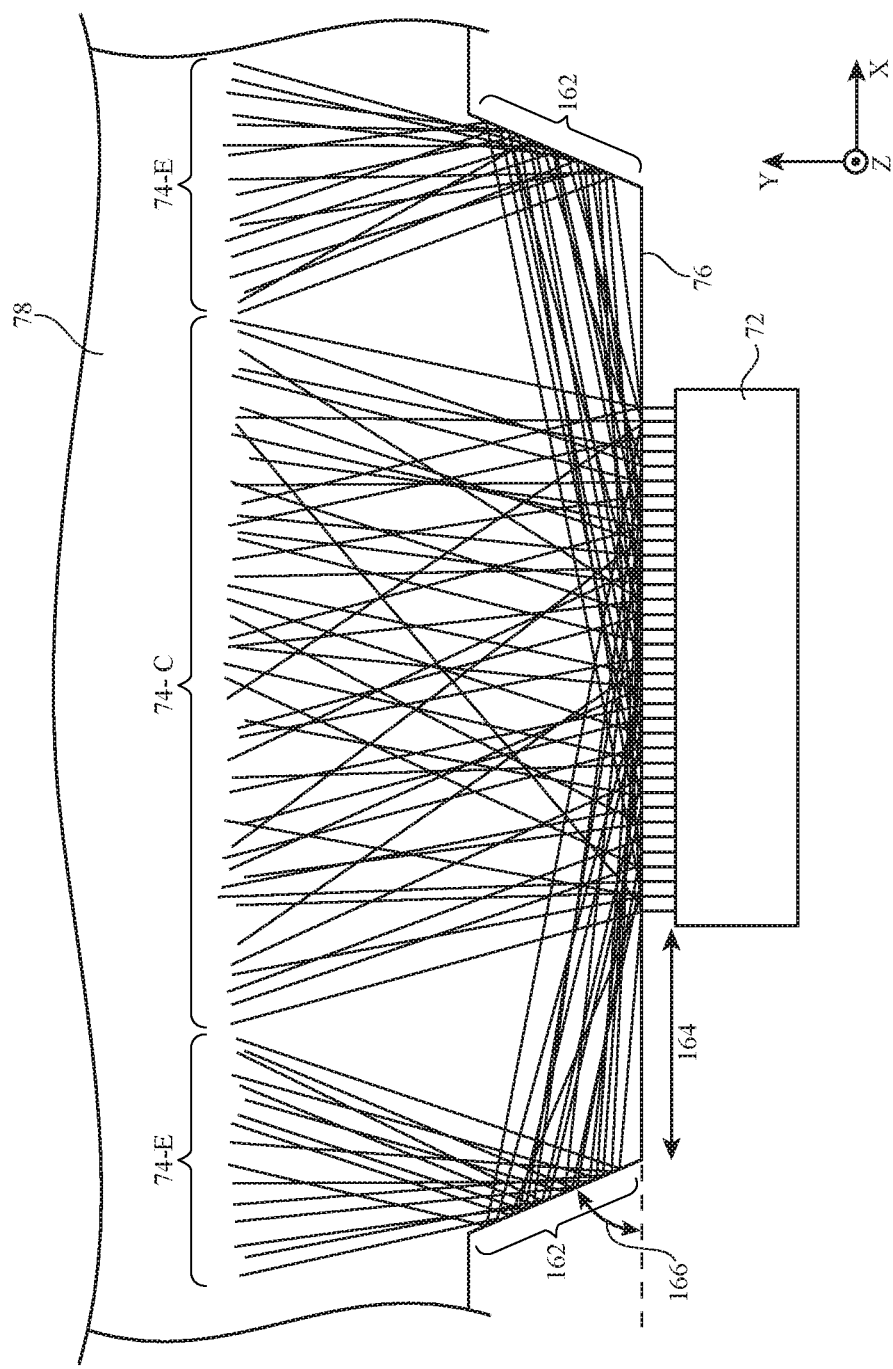
FIG. 14 is a top view of a light-emitting diode emitting light through the light mixing structures of FIGS. 12A and 12B in accordance with an embodiment.

In order to prevent the undesirable effects of high angle light, light guide plate 78 may be provided with a reflective surface as shown in FIG. 14. As shown, light may be emitted from light-emitting diode 72 and pass through light mixing structures 142 such as those shown in FIGS. 12A and 12B. For clarity, the light mixing structures on edge 76 of light guide plate 78 are not drawn in FIG. 14. A first portion of the light (74-C) may pass through the center surfaces of light mixing structures 142 or the planar edge surface 76 (e.g., the planar portions of light guide plate 78 in between each light mixing structure 142). Light 74-C may be emitted in a cone as previously depicted in FIG. 13A. A second portion of the light (74-E) may pass through the edge surfaces of light mixing structures 142. Light 74-E may be refracted at high angles and travel primarily in the X direction. Light 74-E may then be reflected off of a reflective surface 162. Reflective surfaces 162 may direct the high angle light in the Y direction to become low angle light. This causes light 74-E to travel into the light guide plate. The light mixing structures 142 used in combination with reflective surfaces 162 cause light 74 to mix very quickly after being emitted from light-emitting diodes 72. Light 74 will be smoothly distributed along dimension X and will no longer be concentrated near the exits of respective individual light-emitting diodes 72.

The reflective surfaces 162 may be implemented in a variety of different ways. For example, a reflector may be formed on reflective surface 162. Reflector 162 may be formed from a reflective structure such as a substrate layer of plastic coated with a dielectric mirror formed from alternating high-index-of-refraction and low-index-of-refraction inorganic or organic layers. Reflector 162 may be formed from a reflective material such as a layer of white plastic or other shiny materials. In addition or in combination with using a reflective material, reflective surface 162 may have no additional material and use total internal reflection to reflect the light. In certain situations, light that strikes reflective surface 162 at a high enough angle will not pass through the surface and be totally reflected. The light guide plate may be designed so that light 74-E strikes reflective surface 162 at an angle and is reflected due to total internal reflection. In general, any material or setup may be used that reflects light 74-E in the Y direction.

Reflective surface 162 may be separated from the edge of light-emitting diode 72 by distance 164. Distance 164 may be less than 0.1 millimeters, less than 0.5 millimeters, less than 1.0 millimeters, less 1.5 millimeters, greater than 1.0 millimeters, or any other desired distance. Reflective surface 162 may be at an angle 166 with respect to the planar surface of edge 76. Angle 166 may have any desired value (e.g., between 5° and 80°, between 30° and 60°, between 40° and 50°, less than 60°, more than 20°, etc.).

Figure 15:
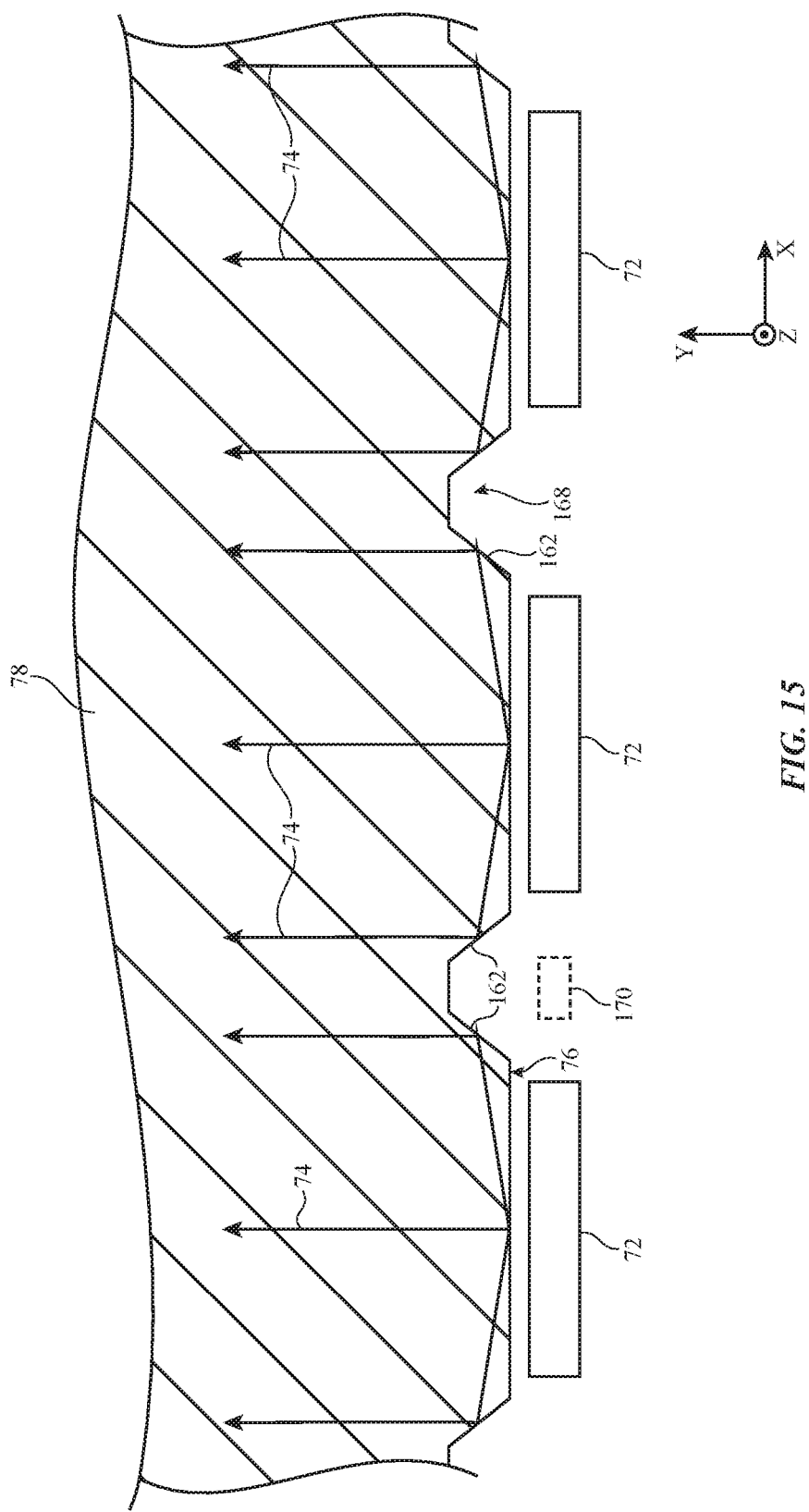
FIG. 15 is a top view of an illustrative light guide plate with recesses that provide a reflective surface in accordance with an embodiment.

FIG. 15 shows an illustrative light guide plate with light mixing structures. As shown, a number of light-emitting diodes 72 may be positioned adjacent to edge 76 of light guide plate 78. Although not drawn in FIG. 15, edge 76 may include light mixing structures such as light mixing structures 142 on the edge of the light guide plate in front of the light-emitting diodes. Light guide plate 78 may include recesses 168 that provide an angled surface for reflective surface 162. Some of light 74 may pass directly through the light mixing structures down the light guide plate while some light may be refracted at a high angle before being reflected in the Y direction by the reflective surface 162.

Adhesive may be positioned between light-emitting diodes 72 (e.g., area 170) on the printed circuit that acts as a substrate for the light-emitting diodes. The adhesive may be used to attach the light-emitting diodes' printed circuit to additional layers in the display.

Figure 16:
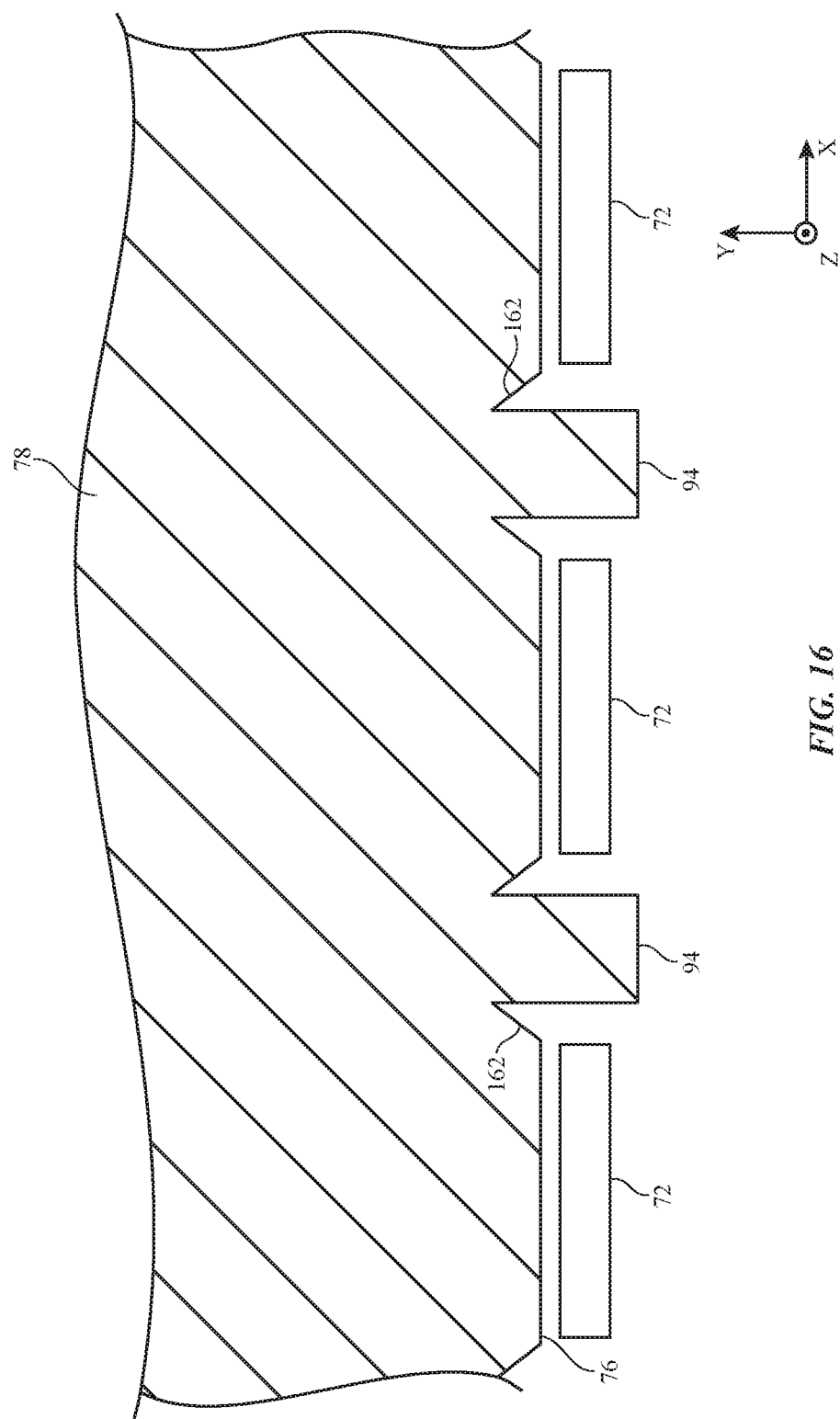
FIG. 16 is a top view of an illustrative light guide plate with protruding portions that provide a reflective surface in accordance with an embodiment.

As discussed in connection with FIG. 9, the light guide plate may have protruding portions 94 that extend adjacent light-emitting diodes 72. Protruding portions 94 may act as a substrate for attaching the printed circuit with light-emitting diodes 72. For example, adhesive may attach the bottom surface of protruding portions 94 to a rigid or flexible printed circuit. Light-emitting diodes may be positioned on the printed circuit such that each light-emitting diode is interposed between two protruding portions 94 when the printed circuit is adhered to protruding portions 94. As shown in FIG. 16, protruding portions 94 may be designed to provide a reflective surface 162 for the light guide plate. Reflective surface 162 may be provided with a reflective material or use total internal reflection to reflect light.

The foregoing is merely illustrative and various modifications can be made by those skilled in the art without departing from the scope and spirit of the described embodiments. The foregoing embodiments may be implemented individually or in any combination.

What is claimed is:

1. A display backlight comprising:
   a row of light-emitting diodes; and
   a light guide plate having first and second opposing surfaces connected by an edge, wherein the edge receives light from the row of light-emitting diodes, wherein the edge has a plurality of protrusions and a reflective portion, wherein a portion of the light that passes through the plurality of protrusions is subsequently reflected by the reflective portion of the edge of the light guide plate, wherein each protrusion comprises first and second surfaces, and wherein each protrusion comprises third and fourth surfaces that are interposed between the first and second surfaces and connect the first surface to the second surface.

2. The display backlight defined in claim 1, wherein the first and second surfaces are at a first angle relative to a planar portion of the edge of the light guide plate.

3. The display backlight defined in claim 2, wherein the third and fourth surfaces are at a second angle relative to the planar portion of the edge of the light guide plate.

4. The display backlight defined in claim 3, wherein the first angle is between 70° and 89°.

5. The display backlight defined in claim 4, wherein the second angle is between 5° and 35°.

6. The display backlight defined in claim 5, wherein the portion of the light that passes through the plurality of protrusions and is subsequently reflected by the reflective portion of the edge of the light guide plate passes through the first and second surfaces of the protrusion.

7. The display backlight defined in claim 1, wherein an additional portion of the light that passes through the plurality of protrusions is not reflected by the reflective portion of the edge of the light guide plate.

8. A display backlight comprising:
   a row of light-emitting diodes;
   a light guide plate having first and second opposing surfaces connected by an edge, wherein the edge receives light from the row of light-emitting diodes, wherein the edge has at least one light mixing structure and a reflective portion, and wherein a portion of the light that passes through the at least one light mixing structure is subsequently reflected by the reflective portion of the edge of the light guide plate; and
   a reflector that is parallel to the first and second opposing surfaces of the light guide plate and substantially perpendicular to the reflective portion of the edge of the light guide plate.

9. The display backlight defined in claim 1, wherein the reflective portion comprises a layer of reflective material on the edge of the light guide plate.

10. The display defined in claim 1, wherein a planar portion of the edge receives the light from the row of light-emitting diodes, and wherein the reflective portion of the edge is at an angle with respect to the planar portion of the edge.

11. A light guide plate comprising:
    a top surface;
    a bottom surface; and
    first and second opposing surfaces that connect the top and bottom surfaces, wherein the first surface has a planar portion and light mixing structures configured to distribute light, wherein the light mixing structures comprise protrusions with edge surfaces and center surfaces, wherein the edge surfaces are at a first angle with respect to the planar portion, wherein the center surfaces are at a second angle with respect to the planar portion, and wherein the first angle is greater than the second angle.

12. The light guide plate defined in claim 11, wherein the first angle is between 70° and 89°.

13. The light guide plate defined in claim 12, wherein the second angle is between 5° and 35°.

14. The light guide plate defined in claim 11, wherein the edge surfaces of the light mixing structures are configured to refract light towards a reflective surface.

15. The light guide plate defined in claim 14, wherein the light guide plate comprises a recess, and wherein the reflective surface at least partially defines the recess.

16. The light guide plate defined in claim 11, wherein the edge surfaces comprise first and second surfaces, and wherein the center surfaces comprise third and fourth surfaces interposed between the first and second surfaces.

17. The light guide plate defined in claim 11, wherein the top surface of the light guide plate has ridges, and wherein the bottom surface of the light guide plate has bumps.

18. The display backlight defined in claim 1, wherein the first, second, third, and fourth surfaces are planar surfaces.

* * * * *